United States Patent

Sonobe et al.

Patent Number: 6,091,859
Date of Patent: Jul. 18, 2000

[54] IMAGE DATA ENLARGING/SMOOTHING PROCESSOR

[75] Inventors: Kenichi Sonobe; Toshifumi Nakamura; Takashi Okabe; Takenori Obara, all of Saitama, Japan

[73] Assignee: Fuji Xerox Co., Ltd., Tokyo, Japan

[21] Appl. No.: 08/194,279

[22] Filed: Feb. 10, 1994

[30] Foreign Application Priority Data

Feb. 12, 1993 [JP] Japan .................................. 5-046045

[51] Int. Cl.[7] .................................................. G06K 9/32
[52] U.S. Cl. .................... 382/298; 382/264; 358/406; 358/466
[58] Field of Search ................................ 382/47, 54, 48, 382/159, 196, 276, 298, 312, 317; 358/406, 444, 448; 353/280

[56] References Cited

U.S. PATENT DOCUMENTS

| | | | |
|---|---|---|---|
| 4,833,531 | 5/1989 | Abe et al. | 382/47 |
| 4,841,375 | 6/1989 | Nakajima et al. | 353/280 |
| 4,893,258 | 1/1990 | Sakuragi | 382/47 |
| 5,032,928 | 7/1991 | Sakai et al. | 358/448 |
| 5,148,499 | 9/1992 | Matsumura | 382/54 |
| 5,168,373 | 12/1992 | Nakamura | 358/406 |
| 5,181,261 | 1/1993 | Nagao | 382/48 |
| 5,418,865 | 5/1995 | Bloomberg | 382/276 |
| 5,434,953 | 7/1995 | Bloomberg | 382/298 |
| 5,438,630 | 8/1995 | Chen et al. | 382/159 |

FOREIGN PATENT DOCUMENTS

| | | | |
|---|---|---|---|
| 60-11885 | 1/1985 | Japan | G09G 1/00 |
| 62-25565 | 2/1987 | Japan | H04N 1/17 |
| 62-60358 | 3/1987 | Japan | H04N 1/387 |
| 1-208154 | 8/1989 | Japan | B41J 3/12 |
| 1 231 569 | 12/1989 | Japan | H04N 1/393 |
| 4 095 177 | 3/1992 | Japan | G06F 15/66 |
| 4 168 878 | 6/1992 | Japan | H04N 1/40 |

OTHER PUBLICATIONS

"Smooth Raster Character Expansion," IBM Technical Disclosure Bulletin, vol. 28, No. 12, May 1986, pp. 5441–5442.

Y. Wang and S. Mitra, "Edge Preserved Image Zooming," Signal Processing IV: Theories and Applications, Sep. 1988, pp. 1445–1448.

W.J. Rhea, "A new technique for enlargement and reconstruction of digital sensor imagery," Mar. 1991, vol. 12, No. 3, pp. 627–634.

*Primary Examiner*—Jose L. Couso
*Assistant Examiner*—Anh Hong Do
*Attorney, Agent, or Firm*—Finnegan, Henderson, Farabow, Garrett & Dunner, L.L.P.

[57] ABSTRACT

Input image data is stored in a register matrix of 7×7 in a successive manner. A pattern detecting section detects a black- or white-pixel connective pattern of the reference pixels of a marked pixel. When the reference pixel pattern is a black-pixel connective pattern of 1:n (n=1, 2, 3, . . . ), an enlarging/smoothing processor section interpolates a part of the enlarged marked pixel with black pixels. When it is a white-pixel connective pattern of 1:n (n=1, 2, 3, . . . ), the enlarging/smoothing processor erases a part of the enlarged marked pixel. As a result, the oblique line can be smoothed. The line that is made thick by the smoothing process can be shaped into a thin line. Thus, a high-quality image can be produced.

10 Claims, 11 Drawing Sheets

FIG. 6(a)

| a1 | a2 | a3 | a4 | a5 | a6 | a7 | a8 | a9 | a10 | ------- |
|----|----|----|----|----|----|----|----|----|-----|---------|
| b1 | b2 | b3 | b4 | b5 | b6 | b7 | b8 | b9 | b10 | ------- |
| c1 | c2 | c3 | c4 | c5 | c6 | c7 | c8 | c9 | c10 | ------- |
| d1 | d2 | d3 | d4 | d5 | d6 | d7 | d8 | d9 | d10 | ------- |
| e1 | e2 | e3 | e4 | e5 | e6 | e7 | e8 | e9 | e10 | ------- |
| f1 | f2 | f3 | f4 | f5 | f6 | f7 | f8 | f9 | f10 | ------- |
| g1 | g2 | g3 | g4 | g5 | g6 | g7 | g8 | g9 | g10 | ------- |

FIG. 6(b)

| a1 | a2 | a3 | a4 | a5 | a6 | a7 |
|----|----|----|----|----|----|----|
| b1 | b2 | b3 | b4 | b5 | b6 | b7 |
| c1 | c2 | c3 | c4 | c5 | c6 | c7 |
| d1 | d2 | d3 | (d4) | d5 | d6 | d7 |
| e1 | e2 | e3 | e4 | e5 | e6 | e7 |
| f1 | f2 | f3 | f4 | f5 | f6 | f7 |
| g1 | g2 | g3 | g4 | g5 | g6 | g7 |

→

| a2 | a3 | a4 | a5 | a6 | a7 | a8 |
|----|----|----|----|----|----|----|
| b2 | b3 | b4 | b5 | b6 | b7 | b8 |
| c2 | c3 | c4 | c5 | c6 | c7 | c8 |
| d2 | d3 | d4 | (d5) | d6 | d7 | d8 |
| e2 | e3 | e4 | e5 | e6 | e7 | e8 |
| f2 | f3 | f4 | f5 | f6 | f7 | f8 |
| g2 | g3 | g4 | g5 | g6 | g7 | g8 |

FIG. 6(c)

| a2 | a3 | --- | --- | --- | --- | ------------- | a1 |
|----|----|-----|-----|-----|-----|---------------|----|
| b2 | b3 | --- | --- | --- | --- | ------------- | b1 |
| c2 | c3 | --- | --- | --- | --- | ------------- | c1 |
| d2 | d3 | --- | --- | --- | --- | ------------- | d1 |
| e2 | e3 | --- | --- | --- | --- | ------------- | e1 |
| f2 | f3 | --- | --- | --- | --- | ------------- | f1 |
| g2 | g3 | --- | --- | --- | --- | ------------- | g1 |

FIG. 6(d)

| b1 | b2 | b3 | --- | --- | --- | --- | ------------- |
|----|----|----|-----|-----|-----|-----|---------------|
| c1 | c2 | c3 | --- | --- | --- | --- | ------------- |
| d1 | d2 | d3 | --- | --- | --- | --- | ------------- |
| e1 | e2 | e3 | --- | --- | --- | --- | ------------- |
| f1 | f2 | f3 | --- | --- | --- | --- | ------------- |
| g1 | g2 | g3 | --- | --- | --- | --- | ------------- |
| h1 | h2 | h3 | --- | --- | --- | --- | ------------- |

(1:1) 61a (1:2) 61a (1:3) 61a (1:4) 61a (1:3) 61a

61a (1:2) 61a (1:3) 61a (1:4) 61a (1:2) 61a

IMAGE DATA ENLARGING/SMOOTHING PROCESSOR

BACKGROUND OF THE INVENTION

The present invention relates to an enlarging/smoothing processor for enlarging and smoothing image data, and more particularly to an enlarging/smoothing processor capable of shaping reproduced characters and figures so as to take natural forms.

In the field of the image processing technology, the technique to enlarge original image data and to print out the enlarged image data by a printer has been put into practical use. When the image data is simply enlarged, notches appear on oblique portions of characters and figures. The notches impair the print picture quality. To avoid this picture quality deterioration, the process for removing the notches, viz., smoothing process, is indispensable.

There are proposed some smoothing techniques as disclosed in Japanese Patent Unexamined Publication Nos. Sho. 60-11885 and Hei. 1-208154.

In the most popular facsimile machine of G3 mode, two resolutions are applied for the received image data under the recommendation of CCITT (International Telegraph and Telephone Consultative Committee); one is a standard resolution of 8 pixels/mm×3.85 lines/mm and the other, a high resolution of 8 pixels/mm×7.7 lines/mm.

Further, the facsimile machines of high resolution and high line densities are recently marketed. In some facsimile machines of G3 mode, 16 pixels/mm×15.4 lines/mm, and in some facsimile machines of G4 mode, a plurality of resolutions are used, which are selected from among 200 dpi, 240 dpi, 300 dpi and 400 dpi.

The facsimile machine with a plurality of resolutions contains a recording device of a higher resolution. To record such image data as to have a resolution lower than that of the recording device, the image data is enlarged before recorded. The reason for this is that if the image data of low resolution is recorded as it is by the high resolution recording device, the image is recorded in the reduced form.

For example, when the received image data of the standard resolution, 8 pixels/mm×3.85 lines/mm, is recorded by a recording device of 400 dpi, the image is halved in the fast scan direction and is quartered in the slow scan direction. Accordingly, to record the received image data of the resolution, 8 pixels/mm×3.85 lines/mm, by a recording device of 400 dpi, the received image data must be enlarged to be approximately two times as large as the original one in the fast scan direction, and to be approximately four times in the slow scan direction.

The technique to record the image data of low resolution by the recording device of high resolution after the image data is enlarged is disclosed in Japanese Patent Unexamined Publication Nos. Sho. 62-25565 and 62-60358, for example.

To execute the smoothing technique, a high level interpolation process using an increased number of reference pixels adjoining to a marked pixel must be carried out at a high speed and at an optional enlargement ratio is required for the smoothing process. However, the conventional smoothing processor cannot carry out such a high level interpolation process.

Additionally, the conventional image processor further suffers from the following problems. It is difficult to smooth steeply oblique lines. The smoothing process makes lines fat, deteriorates the picture quality, and deforms the right-angled corner.

SUMMARY OF THE INVENTION

Accordingly, an object of the present invention is to provide an image data enlarging/smoothing processor which can carry out a high-level interpolation process at an optional enlargement ratio and a high speed.

Another object of the present invention is to provide an image data enlarging/smoothing processor which succeeds in solving the above-mentioned problems.

To achieve the above objects, the invention provides an image data enlarging/smoothing processor for carrying out an interpolation process of pixels simultaneously with a pixel density conversion of binary image data, including connective pattern detecting means for detecting a form of a connective pattern of reference pixels adjoining to a marked pixel, and enlarging/smoothing processing means operating such that the processing means enlarges the marked pixel on the basis of enlargement ratios in fast and slow scan directions, whereby enlarging and smoothing the marked pixel on the basis of the form of the connective pattern of the reference pixels and processing positions in the fast and slow scan directions.

Further, the invention provides an image data enlarging/smoothing processor including enlargement ratio determining means for determining enlargement ratios in fast and slow scan directions, which lead to a resolution of an output image, in accordance with a resolution of input image data, enlargement processing means for developing a pixel area occupied by a marked pixel after the marked pixel is enlarged in accordance with the enlargement ratios determined by the enlargement ratio determining means, the pixel area consisting of a plurality of pixels, detecting means for detecting a connective pattern of reference pixels adjoining to the marked pixel in the input image data, and black/white determining means for determining whether or not the respective pixels of the pixel area are black or white in accordance with the connective pattern detected by the detecting means.

BRIEF DESCRIPTION OF THE DRAWINGS

FIGS. 6(a) to 6(d) are explanatory diagrams for explaining the operation of the image processor shown in FIG. 1;

DETAILED DESCRIPTION OF THE PREFERRED EMBODIMENTS

Figure 4:
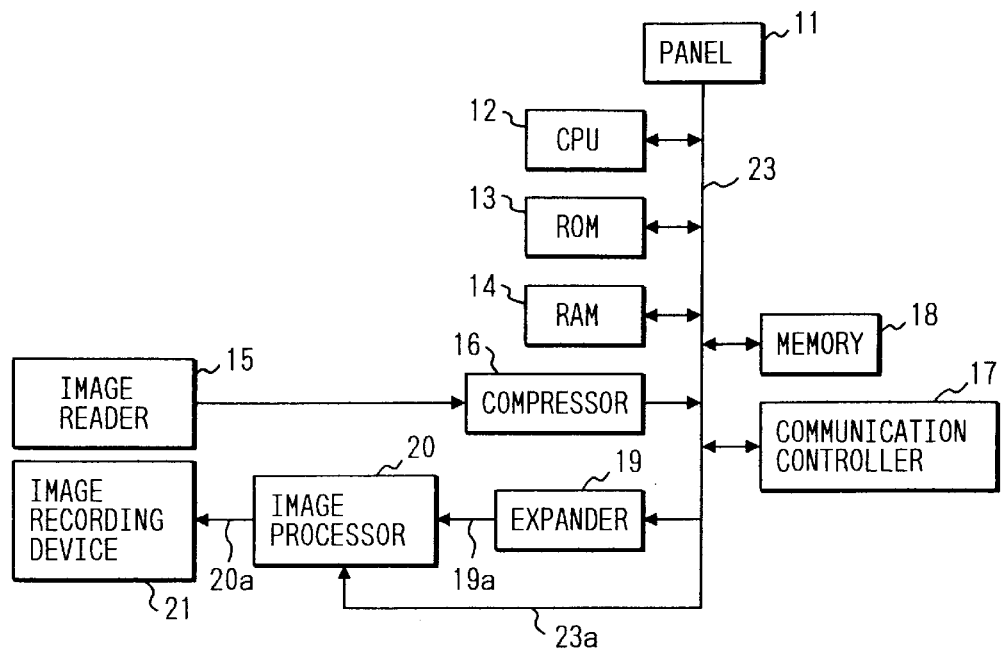
FIG. 4 is a block diagram showing a hardware arrangement of a facsimile machine incorporating the present invention.

The present invention will be described in detail with reference to the accompanying drawings. FIG. 4 is a block diagram showing a hardware arrangement of a facsimile machine containing an image processor, which includes enlarging/smoothing processing means according to the present invention. In the embodiments to follow, the enlarging/smoothing processing means is incorporated into a facsimile machine, but it may be applied for another suitable machines.

In FIG. 4, reference numeral 11 designates an operation panel for entering operation instructions to the facsimile machine; 12, a CPU for controlling the overall operation of the facsimile machine; 13, a ROM for storing programs to be executed by the CPU 12; and 14, a RAM providing a work area to be used by the programs. Reference numeral 15 designates an image reader for reading an image out of an original document to be transmitted and outputting binary image data. A compressor 16 converts the binary image data received from the image reader 15 into code data. A communication controller 17 is used for transmitting and receiving the code data to and from another facsimile machine.

A memory 18 stores the code data from the compressor 16 or from another facsimile machine. An expander 19 reads the code data from the memory 18 and expands it into binary image data. An image processor 20 enlarges and interpolates the binary image data from the expander 19. An image recording device 21 records the binary image data after undergone the enlarging/smoothing process in the image processor 20. A bus 23 connects the above-described system components.

Figure 1:
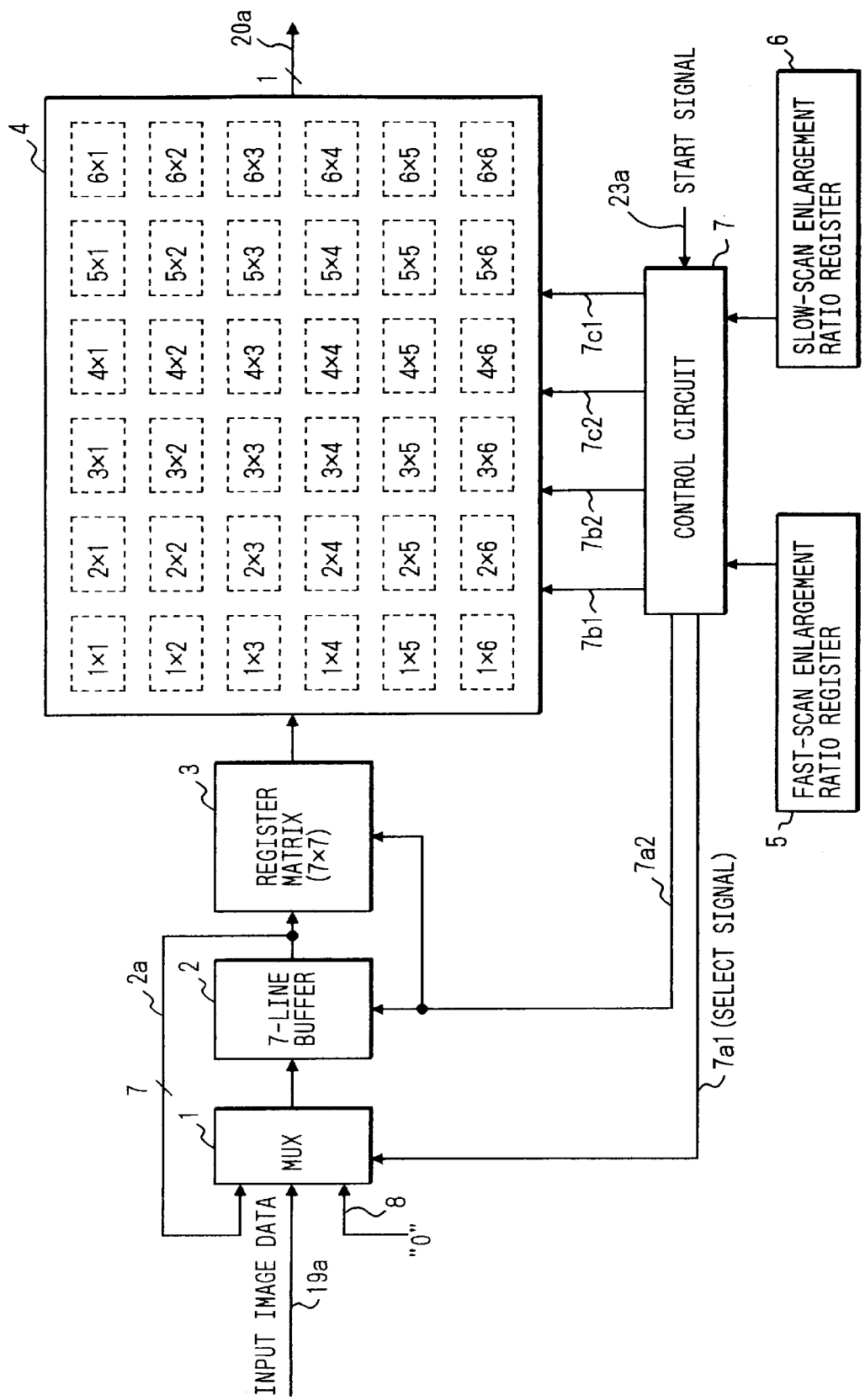
FIG. 1 is a block diagram showing an image processor according to an embodiment of the invention.

The image processor 20 will be described in detail with reference to FIG. 1. FIG. 1 is a block diagram showing the image processor 20 according to an embodiment of the present invention. In the figure, like reference numerals are used for designating like or equivalent portions in FIG. 4.

In FIG. 1, reference numeral 1 designates a multiplexer (MUL), which selects one data signal from among an input image data signal 19a received from the expander 19, a white ("0") data signal 8, and a preceding-line data signal 2a, and outputs the selected one to a line buffer 2. The line buffer 2 is a (2n+1) line buffer (n: positive integer), and a 7-line buffer (n=3) in this embodiment. The 7-line buffer 2 stores a line of the image data to be interpolated and the preceding three lines and succeeding three lines to that line, totally 7 lines.

A register matrix 3 of (2n+1)×(2n+1) stores the pixels (referred to as reference pixels) adjoining to a marked pixel contained in the line to be interpolated. In this embodiment, it is a register matrix where n=3, viz., a register matrix of 7×7, and stores 49 pixels adjoining to the marked pixel. An enlargement processing block 4 is provided for enlarging the image data by an enlargement ratio of k×l (k: enlargement ratio in the fast scan direction and l: enlargement ratio in the slow scan direction). In this embodiment, k=l=6. The enlargement processing block 4 is capable of enlarging and smoothing the image data in the range from 1×1 to 6×6.

Reference numeral 5 designates a fast-scan enlargement ratio register for setting an enlargement ratio in the fast scan direction, and numeral 6 designates a slow-scan enlargement ratio register for setting an enlargement ratio in the slow scan direction. A control circuit 7 outputs a select signal 7a1 for selecting any of the image data signals input to the multiplexer 1, i.e., the image data signal 19a, the white data signal 8, and the preceding-line data signal 2a, select signals 7b1 and 7c1 for selecting one of the enlargement ratios stored in the enlargement processing block 4, and select signals 7b2 and 7c2 used in the smoothing processing.

The preceding-line data signal 2a consists of data of 7 bits taken out of the data of 7 lines that are stored in the 7-line buffer 2. In this case, data of 1 bit is taken out of each line data. Reference numeral 8 designates the white ("0") data signal.

Figure 2:
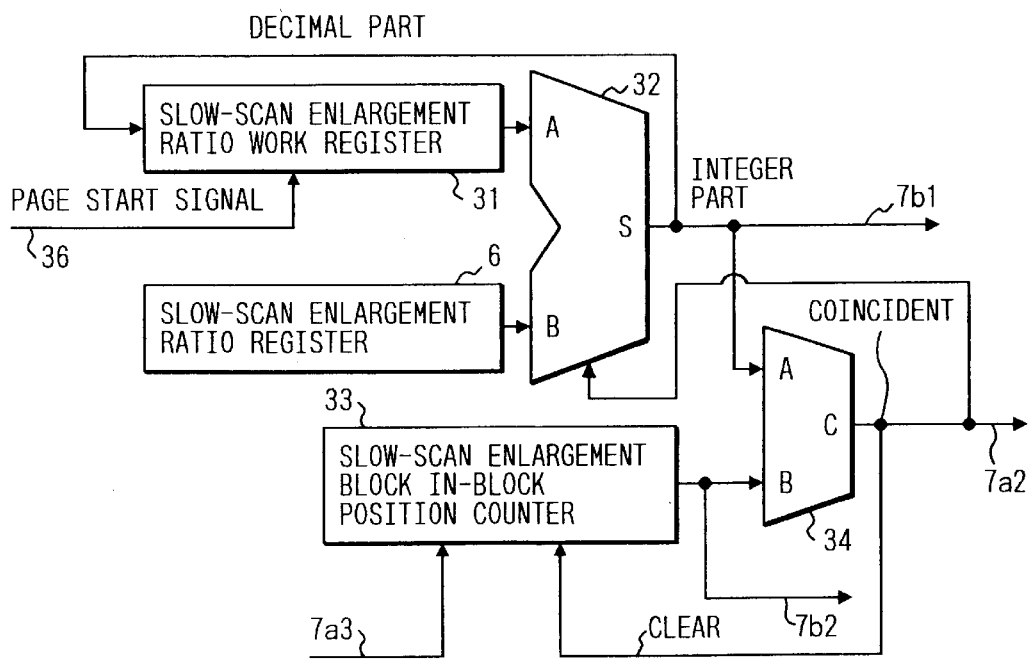
FIG. 2 is a block diagram showing a control section for the slow scan direction in the control circuit.
Figure 3:
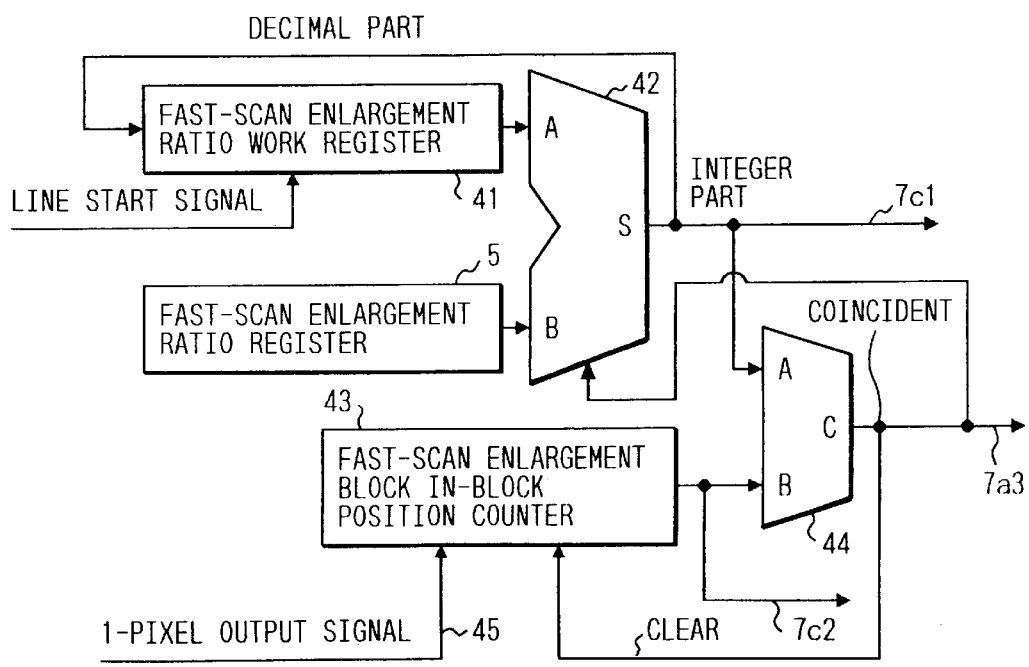
FIG. 3 is a block diagram showing a control section for the fast scan direction in the control circuit.

The specific arrangement of the control circuit 7 will be described with reference to FIGS. 2 and 3. FIG. 2 shows the arrangement of a control section for the slow scan direction, and FIG. 3 shows the arrangement of a control section for the fast scan direction. In FIGS. 2 and 3, the blocks and signals that are designated by like reference numerals are the same as those in FIG. 1. Therefore, no further description of those will be given.

In FIG. 2, reference numeral 31 designates a slow-scan enlargement ratio work register, which is cleared by a page start signal 36 indicative of the start of a page; 32, an adder; 33, a slow-scan enlargement block in-block position counter; and 34, a comparator.

The adder 32 adds together an enlargement value preset in the slow-scan enlargement ratio register 6 and a value stored in the slow-scan enlargement ratio work register 31. The integer part of the addition result is transferred as a slow-scan enlargement block select signal 7b1 to the enlargement processing block 4 (FIG. 1). The decimal part of the addition result is stored in the slow-scan enlargement ratio work register 31.

Let us consider a case where an enlargement value preset in the slow-scan enlargement ratio register 6 is "4.4". At the initial stage, the slow-scan enlargement ratio work register 31 is "0" because it is cleared. The adder 32 produces "4.4" as the result of the first addition. "4" which is the integer part is transferred to the enlargement processing block 4, as a slow-scan enlargement block select signal 7b1, while "0.4" which is the decimal part is stored into the slow-scan enlargement ratio work register 31.

Next, the result of the second addition is "4.8". "4" which is the integer part is transferred to the enlargement processing block 4, as the slow-scan enlargement block select signal 7b1, while "0.8" which is the decimal part is stored into the slow-scan enlargement ratio work register 31. Subsequently, a similar operation is repeated. The values of the integer part output from the adder 32 will be "4", "4", "5", "4", "4", . . .

The enlargement processing block 4 selects the enlargement block in the slow scan direction in accordance with the data of the integer part. As a result, the image data is enlarged about 4.4 times as large as the original one, in average.

The arrangement of the control section for the fast scan direction will be described with reference to FIG. 3. In the figure, reference numeral 41 designates a fast-scan enlargement ratio work register 41; 42, an adder; 43, a fast-scan enlargement block in-block position counter 43; and 44, a comparator.

The fast-scan enlargement ratio work register 41 is cleared by a line start signal indicative of the start of a line. An enlargement ratio for the fast scan direction of the image data is previously set in the fast-scan enlargement ratio work register 5. The operation of the adder 42 resembles that of the adder 32. Therefore, description of it is omitted here.

Figure 5:
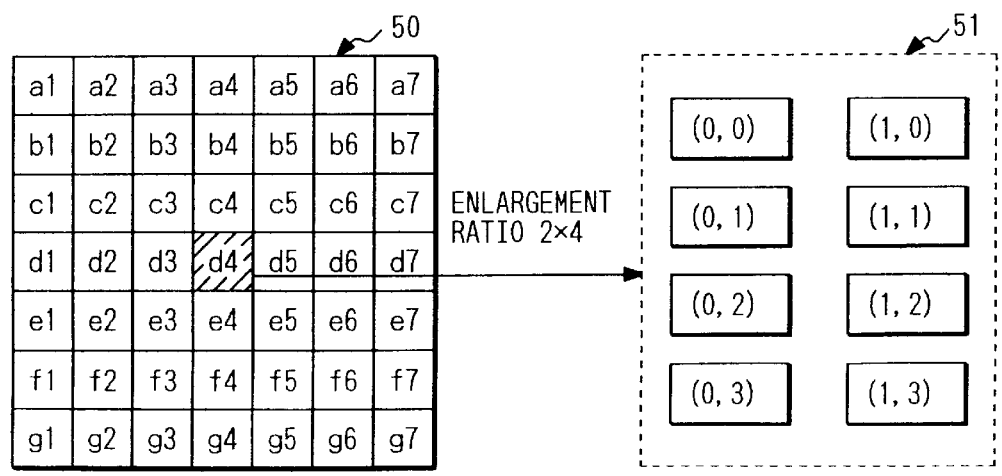
FIG. 5 is a diagram useful in explaining the technical meanings of fast- and slow-scan enlargement block in-block positions 7c2 and 7b2.

Next, the operations of the slow-scan enlargement block in-block position counter 33, the fast-scan enlargement block in-block position counter 43, and the comparators 34 and 44 will be described with reference to exemplary data shown in FIG. 5. In FIG. 5, reference numeral 50 designates exemplary data temporarily stored in the register matrix 3, and 51 designates the specified positions of a specified enlargement ratio.

A coincident signal 7a3 to be described later is input to the slow-scan enlargement block in-block position counter 33. A 1-pixel output signal 45 is input to the fast-scan enlargement block in-block position counter 43. The 1-pixel output signal 45 is different from a bit sync signal, which is used when an image data signal 19a is transferred from the expander 19 to the image processor 20.

Let us consider a case where the integer part 7c1 for the fast scan direction of the image data is "2", and the integer part 7b1 for the slow scan direction is "4". In this case, a marked pixel d4 is enlarged two times in the fast scan direction, and four times in the slow scan direction. A block for developing a pixel area occupied by the marked pixel after it is enlarged, is referred to as an enlargement processing block. The positions specified for the enlargement and smoothing processes are a slow-scan enlargement block in-block position 7b2 and a fast-scan enlargement block in-block position 7c2, respectively.

Referring to FIG. 3, "2" is present at the terminal A of the comparator 44 since the integer part 7c1 is "2". When receiving the 1-pixel output signal 45, the fast-scan enlargement block in-block position counter 43 counts up, and outputs a count signal as the fast-scan enlargement block in-block position 7c2. In this specific example, when the count output is "2", the comparator 44 outputs the coincident signal 7a3. Then, "0" and "1" are successively output as the fast-scan enlargement block in-block position 7c2. The output signals, as shown in FIG. 5, are address signals "0" and "1" in the fast scan direction of the specified position.

Similarly, "0", "1", "2", and "3" are successively output as the slow-scan enlargement block in-block position 7b2 in FIG. 2. The output signals, as shown in FIG. 5, are address signals "0" to "3" in the slow scan direction of the specified position.

Next, the operation of the entire image processor shown in FIG. 1 will be described with reference to FIGS. 6(a) to 6(d), and 7(a) and 7(b).

Before starting up the enlargement process, the multiplexer 1 shown in FIG. 1 selects the white data signal 8, and the selected white data is stored in the entire memory area of the 7-line buffer 2. In other words, the 7-line buffer 2 is cleared.

In carrying out the enlargement process, the CPU 12 sets enlargement ratios in the fast-scan enlargement ratio register 5 and the slow-scan enlargement ratio work register 6, and outputs a start signal 23a for transmission to the image processor 20. The multiplexer 1 successively loads the image data signal 19a to the 7-line buffer 2 in response to the input image data select signal 7a1.

When the image data signal 19a is stored in the 7-line buffer 2, the enlargement process starts. FIG. 6(a) shows a data-stored state of the 7-line buffer 2 in which the image data of seven lines including the white data of three lines are stored.

Immediately after the operation, the slow-scan enlargement ratio work register 31 is cleared by the page start signal, while the fast-scan enlargement ratio work register 41 is cleared by the line start signal 35.

Next, an operation start signal is input to the adder 42 in FIG. 3. In response to this signal, the adder 42 adds together the enlargement ratio from the fast-scan enlargement ratio register 5 and the value from the fast-scan enlargement ratio work register 41. Then, the adder 42 transfers the integer part 7c1 as a fast-scan enlargement block select signal to the enlargement processing block 4. The operation start signal is input also to the adder 32 in FIG. 2. In response to this signal, the adder 32 adds together the enlargement ratio from the slow-scan enlargement ratio register 6 and the value from the slow-scan enlargement ratio work register 31. The integer part 7b1 as the result of addition is transferred as a slow-scan enlargement block select signal to the enlargement processing block 4.

Upon receipt of the select signals 7b1 and 7c1, the enlargement processing block 4 selects an enlargement processing block. If the fast- and slow-scan enlargement block select signals are "2" and "4" respectively, the enlargement processing block 4 selects an enlargement processing block of 2×4.

Figure 7A:
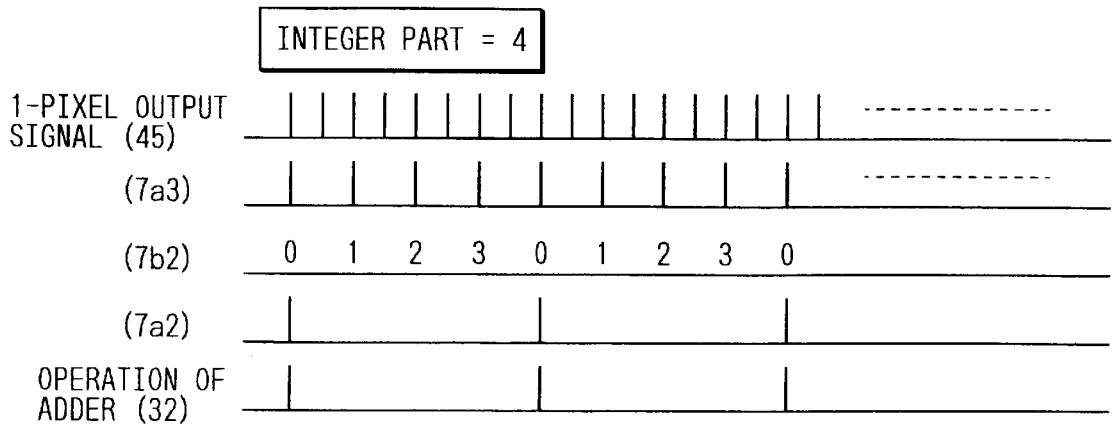
FIGS. 7(a) and 7(b) are timing charts showing signals at key portions of the image processor shown in FIG. 1.
Figure 7B:
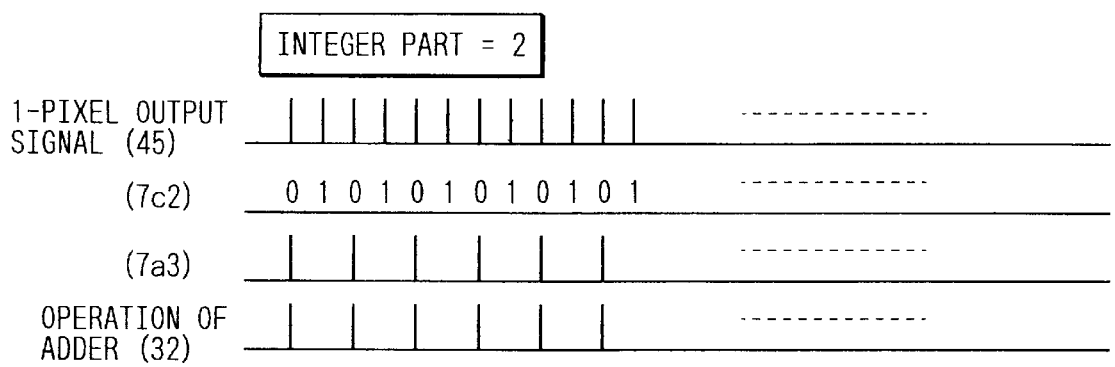

When the fast-scan enlargement block in-block position counter 43 shown in FIG. 3 receives the 1-pixel output signal 45 as shown in FIG. 7(b), the fast-scan enlargement block in-block position 7c2 is incremented one by one, "0", "1", and "2". When it reaches "2", the comparator 44 produces the coincident signal 7a3.

This coincident signal 7a3 serves as a trigger signal to the adder 42 and also as a clear signal to the fast-scan enlargement block in-block position counter 43. Accordingly, when the coincident signal 7a3 is produced, the adder 42 operates for addition and the fast-scan enlargement block in-block position counter 43 is cleared.

The coincident signal 7a3 is applied also to the slow-scan enlargement block in-block position counter 33 which in turn counts up. The slow-scan enlargement block in-block position counter 33, as shown in FIG. 7(a), continues the count-up operation till the comparator 34 produces the coincident signal 7a2. Then, the counter 33 is cleared by the coincident signal 7a2.

When 7c1=2 and 7b1=4, the output signal 7b2 of the slow-scan enlargement block in-block position counter 33 changes its contents, "0", "1", "2", "3", "0", "1", . . .

The coincident signal 7a2 of the comparator 34 serves as a trigger signal to the adder 32, and also as an input signal to the 7-line buffer 2 and the register matrix 3. Then, the 7-line buffer 2 shifts the image data of seven lines each by one bit, in parallel. As a result, data 2a of 7 bits passes through the multiplexer 1 and shifts to the head of the 7-line buffer 2. This state is illustrated in FIG. 6(c).

With the concurrent of the operation, new 7 bits are loaded into the register matrix 3, while the old 7 bits are erased. This state is illustrated in FIG. 6(b). As a result, the marked pixel is changed from d4 to d5.

Repeating the above sequence of operations completes the processing of one line. Upon the completion, the select signal 7a1 is input to the multiplexer 1 shown in FIG. 1. In response to this signal 7a1, the multiplexer 1 continuously selects the image data signal 19a for a fixed period. The image data signal 19a of 1 line is loaded into the 7-line buffer 2. At this time, the oldest image data of 1 line in the 7-line buffer 2 is erased. This state is shown in FIG. 6(d).

The arrangement and operation of the image processor essential to the present invention have described by way of example.

Next, the enlarging/smoothing processor according to the present invention will be described in detail.

Figure 8:
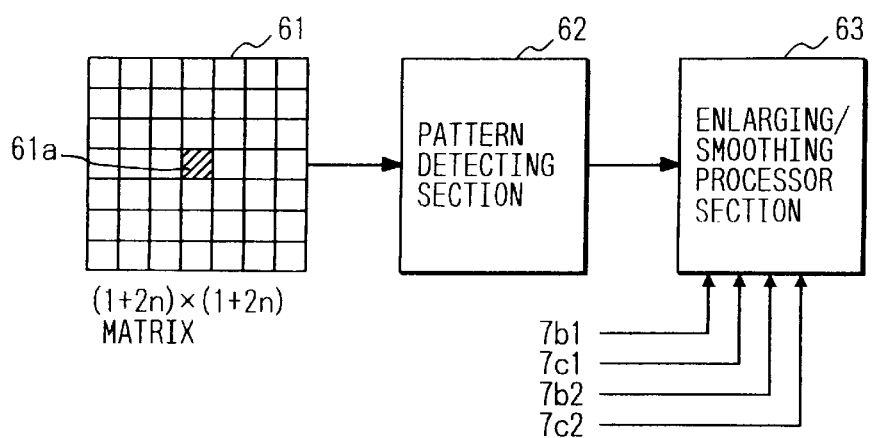
FIG. 8 is a block diagram showing the schematic arrangement of an enlarging/smoothing processor according to the present invention.

FIG. 8 is a block diagram showing the enlarging/smoothing processor according to the present invention. In the figure, reference numeral 61 designates a register matrix of (1+2n)×(1+2n) (n: positive integer), in which a marked pixel 61a is located at the center. A pattern detecting section 62 detects a pattern of pixels adjoining to the marked pixel 61a. An enlarging/smoothing processor section 63 carries out an enlarging process based on the enlargement ratios in the fast and slow scan directions, and a smoothing process for the pixel pattern.

The enlarging/smoothing processor section 63 receives enlargement ratios 7c1 and 7b1 in the fast and slow scan directions, and fast- and slow-scan enlargement block in-block positions 7c2 and 7b2. The enlarging/smoothing processor section 63 enlarges the marked pixel 61a at the enlargement ratios 7c1 and 7b1, and determines whether or not the interpolation is required for the pixels at the individual enlarged pixels, i.e., the pixels specified by the positions 7c2 and 7b2.

When the enlargement ratios 7c1 and 7b1 are "2" and "4" (viz., magnification of 2×4), the enlarging/smoothing processor enlarges the marked pixel 61a (2×4) times as large as the original one, as shown in FIGS. 10(a) to 10(e). Further, it determines whether or not the interpolation is required for eight pixels generated by the enlargement. The technical meaning of the illustration of FIGS. 10(a) to 10(e) will be described later in detail.

Next, the operation of the present embodiment will be described with reference to a flowchart shown in FIG. 9.

In step S1, to detect a pattern of pixels or reference pixels adjoining to the marked pixel 61a, the pattern detecting section 62 compares the reference pixel pattern successively with the forms of four directions of 1:1. If the pattern detecting section 62 fails to find the coincidence of them, viz., the answer is NO, the system control proceeds to step S2. In this step, the pattern detecting section 62 compares the reference pixel pattern successively with the forms of the eight directions of the pattern of 1:2. In step S3, the pattern detecting section 62 compares the reference pixel pattern successively with the forms of the eight directions of the pattern of 1:n (n=3, 4, . . . ).

In other words, if the connective pattern of the back reference pixels of the marked pixel 61a belongs to any of the patterns of FIGS. 10(a) to 10(e), for example, the answer to any of steps S1 to S3 is YES, and the control proceeds to step S5. It is evident that there are many other patterns than those shown in FIGS. 10(a) to 10(e).

When the answers to all the decision diamonds of steps S1 to S3 are NO, step S4 determines that no interpolation is carried out. Then, the control proceeds to step S8. In this step, the control determines whether or not all the positions of the specified enlargement ratio of one marked pixel have been processed.

On the other hand, when the answer to any of the decision diamonds of steps S1 to S3 is YES, the control proceeds to step S5. In this step, the control determines whether or not the interpolation is required at the specified positions (7c1, 7b1, 7c2, 7b2) of the specified enlargement ratios. The system control first determines whether or not the interpolation is required at the specified position (0, 0) (51 in FIG. 5). If the answer is NO, the control proceeds to step S6 where no interpolation is carried out. If the answer is YES, the control proceeds to step S7 where the interpolation is carried out.

Next, in step S8, it is determined whether or not all the positions of one marked pixel have been interpolated. If the answer is NO, step S9 is executed where the position is counted up and the next specified position (0, 1) is specified. Then, steps S1 to S3 are executed again, and in step S5 it is determined whether the interpolation at the specified position (0, 1) is required or not. The above sequence of the steps is repeated. When the answer to step S8 is YES, the control proceeds to step S10. In this step, the control determines whether or not the input pixel data have all been processed. If the answer is NO, the control proceeds to step S11. In this step, the marked pixel is shifted to the next pixel, and a process similar to the above is repeated.

After repeating the process, if the answer to step S10 is YES, the enlarging/smoothing process ends. In addition, step S5 employs the algorithm to determine whether or not the interpolation is made depending on the specified enlargement ratio, the specified position, and the connective pattern. The details of the algorithm will not be described.

According to this embodiment, when the pattern of the reference pixels of the marked pixel corresponds to any of those shown in FIGS. 10(a) to 10(e), the shaded portions of the marked pixel 61a are interpolated. Accordingly, the oblique portions of the image data are smoothed, improving the picture quality of characters and the like.

Figure 11:
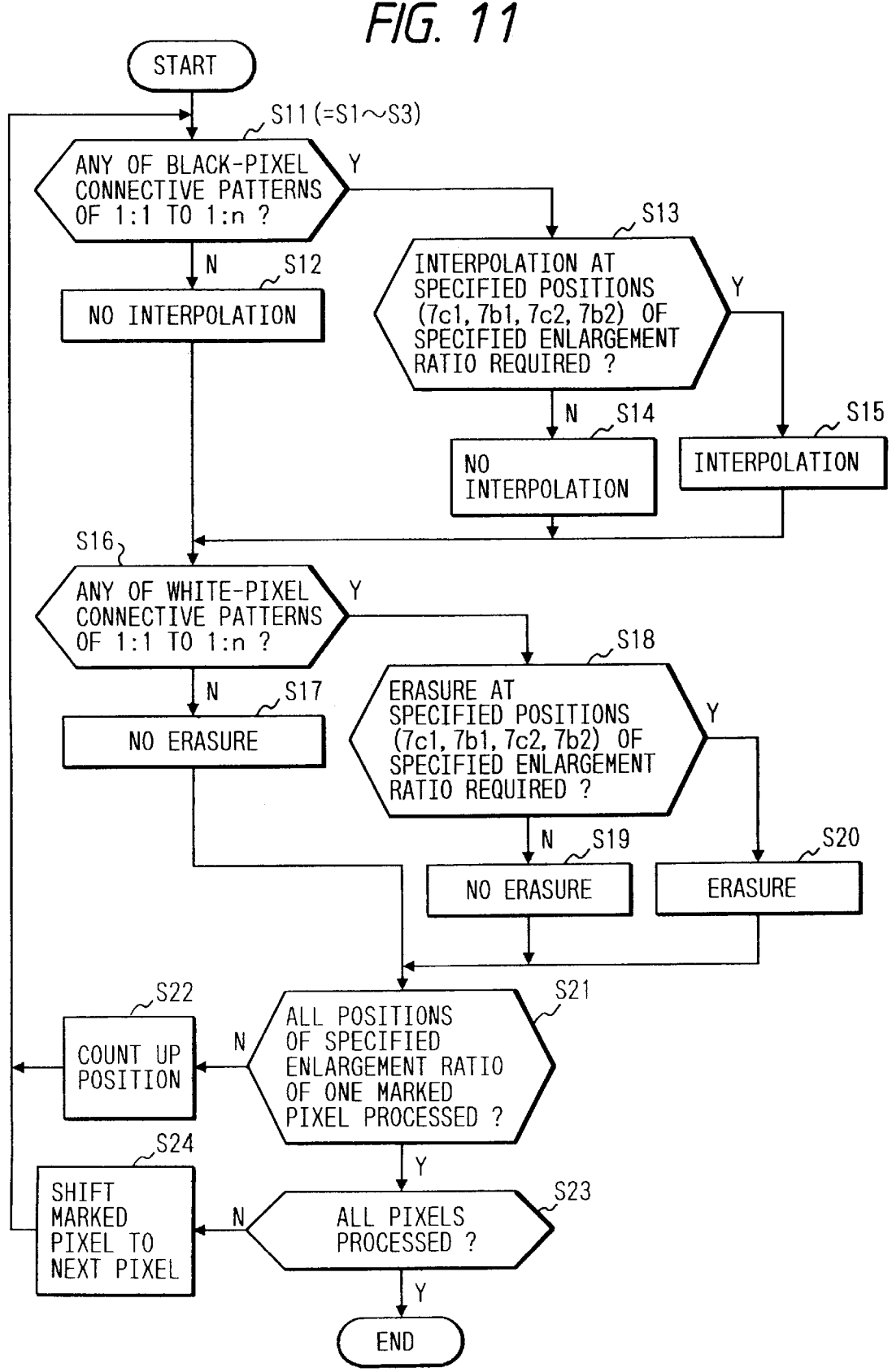
FIG. 11 is a flowchart showing the operation of a second embodiment of the present invention.

Next, the operation of the second embodiment of the present invention will be described with reference to a flowchart shown in FIG. 11.

Figure 9:
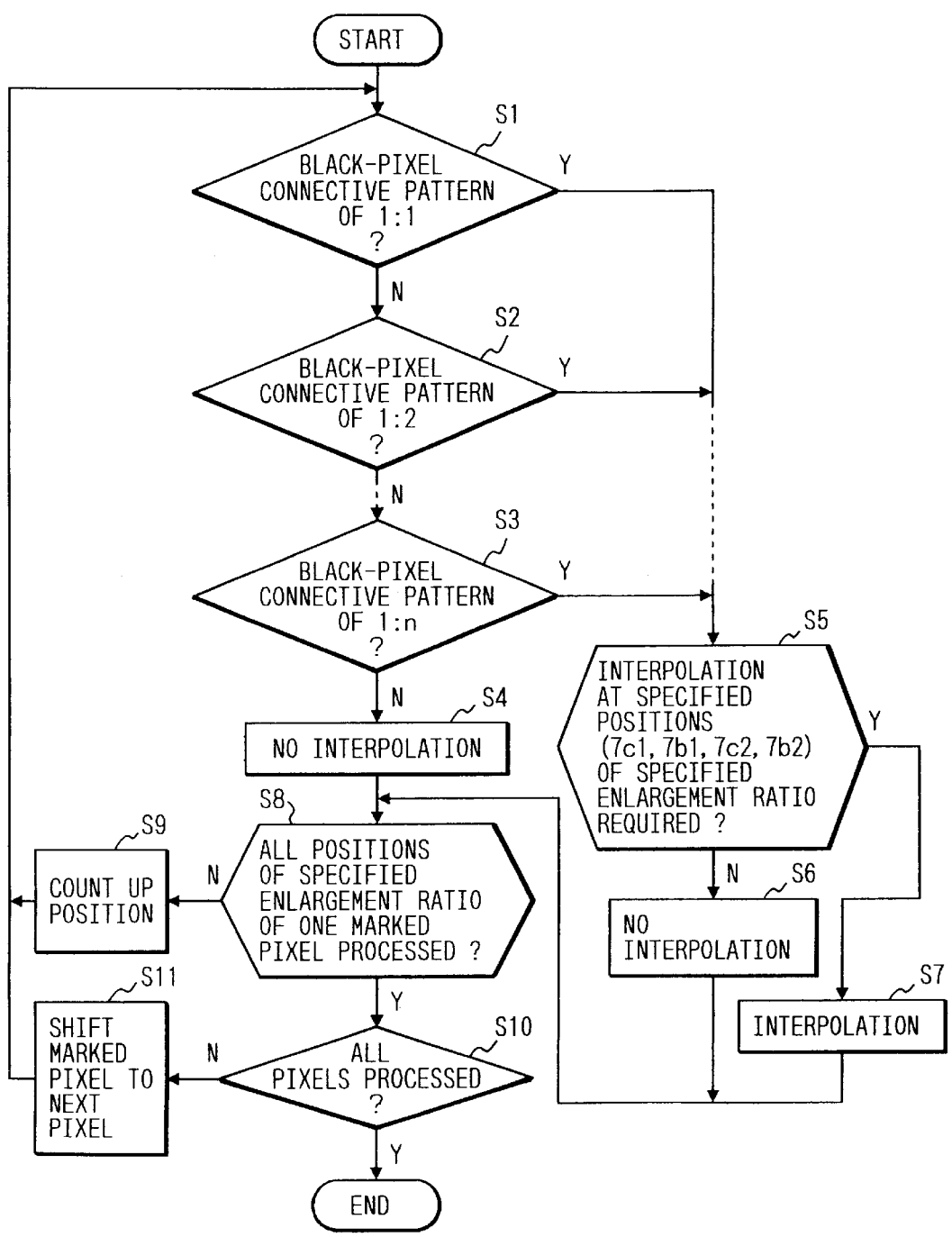
FIG. 9 is a flowchart showing the operation of a first embodiment of the present invention.
Figure 10A:
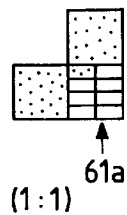
FIGS. 10(a) to 10(e) are explanatory diagrams for explaining the interpolation of the first embodiment.
Figure 10B:
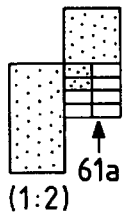
Figure 10C:
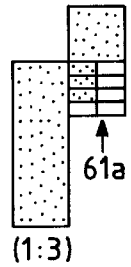
Figure 10D:
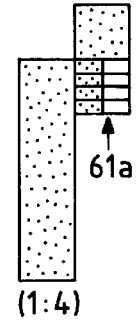
Figure 10E:
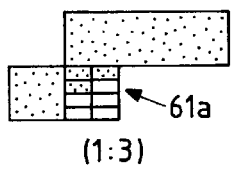

In step S11, which corresponds to steps S1 to S3 in FIG. 9, the pattern detecting section detects the pattern of the pixels adjoining to the marked pixel, viz., searches a pattern of the reference pixels of the marked pixel from among the black-pixel connective pattern of the four directions of 1:1, the black-pixel connective pattern of the eight directions of 1:2, . . . , and the black-pixel connective pattern of the eight directions of 1:n. The tasks of steps S12, S13, S14, and S15 are the same as those of steps S4, S5, S6, and S7. Therefore, description of those steps is not given here.

In step S16, the pattern detecting section detects a pattern of the reference pixels of the marked pixel from among the white-pixel connective pattern of four directions of 1:1, the white-pixel connective pattern of the eight directions of 1:2, . . . , and the white-pixel connective pattern of the eight directions of 1:n.

If the answer to step S16 is NO, the control proceeds to step S17 where the marked pixel is not erased. Then, the control proceeds to step S21. If the answer to step S16 is YES, the control proceeds to step S18. In this step, the control determines whether or not erasure is required at the specified positions (7c1, 7b1, 7c2, 7b2) of the specified enlargement ratio. If the answer is NO, the control proceeds to step S19 where the process of no erasure is carried out. If the answer is YES, the control proceeds to step S20 where the process of erasure is carried out.

Then, the control proceeds to step S21 to check if all the positions of the specified enlargement ratio of one marked pixel have been processed. If the answer is NO, the control proceeds to step S22 where the specified position is counted up. Then, the control returns to step S11, and the above-described process is repeated.

When the sequence of steps is repeated, and the specified positions are all processed, the answer to step S21 is YES, and the control proceeds to step S23.

Here, the operation for steps S16 to S20 till the answer to step S21 is YES will be described with reference to FIGS. 12(a) to 12(e).

Figure 12A:
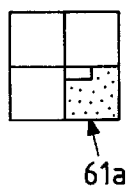
FIGS. 12(a) to 12(e) are explanatory diagrams for explaining the erasure of the second embodiment.
Figure 12B:
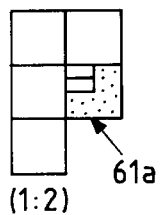
Figure 12C:
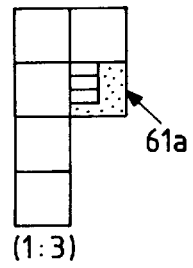
Figure 12D:
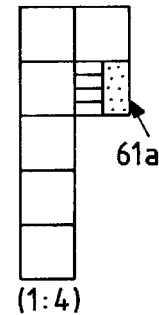
Figure 12E:
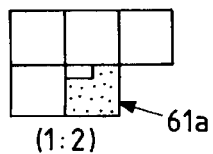

As shown in FIG. 12(a), when the reference pixel pattern of the marked pixel 61a is the white-pixel connective pattern of 1:1, the pixel at the position (0, 0) is erased. When it is the white-pixel connective pattern shown in FIG. 12(b), the pixels at the positions (0, 0) and (0, 1) are erased. When it is the white-pixel connective pattern shown in FIGS. 12(c), 12(d) or 12(e), the pixels at the positions illustrated are erased.

In addition, step S18 employs the algorithm to determine whether or not the erasure is made depending on the specified enlargement ratio, the specified position, and the connective pattern. The details of the algorithm will not be described.

As described above, in the present embodiment, the corner of the oblique portion of the character, for example, is erased. As a result, the image is smoothed in shape. The line made thick by the interpolation process in steps S11 to S15 can be modified to be thin by the process in steps S16 to S20. Accordingly, the second embodiment provides beautiful and high-quality images, such as characters and figures.

Figure 13:
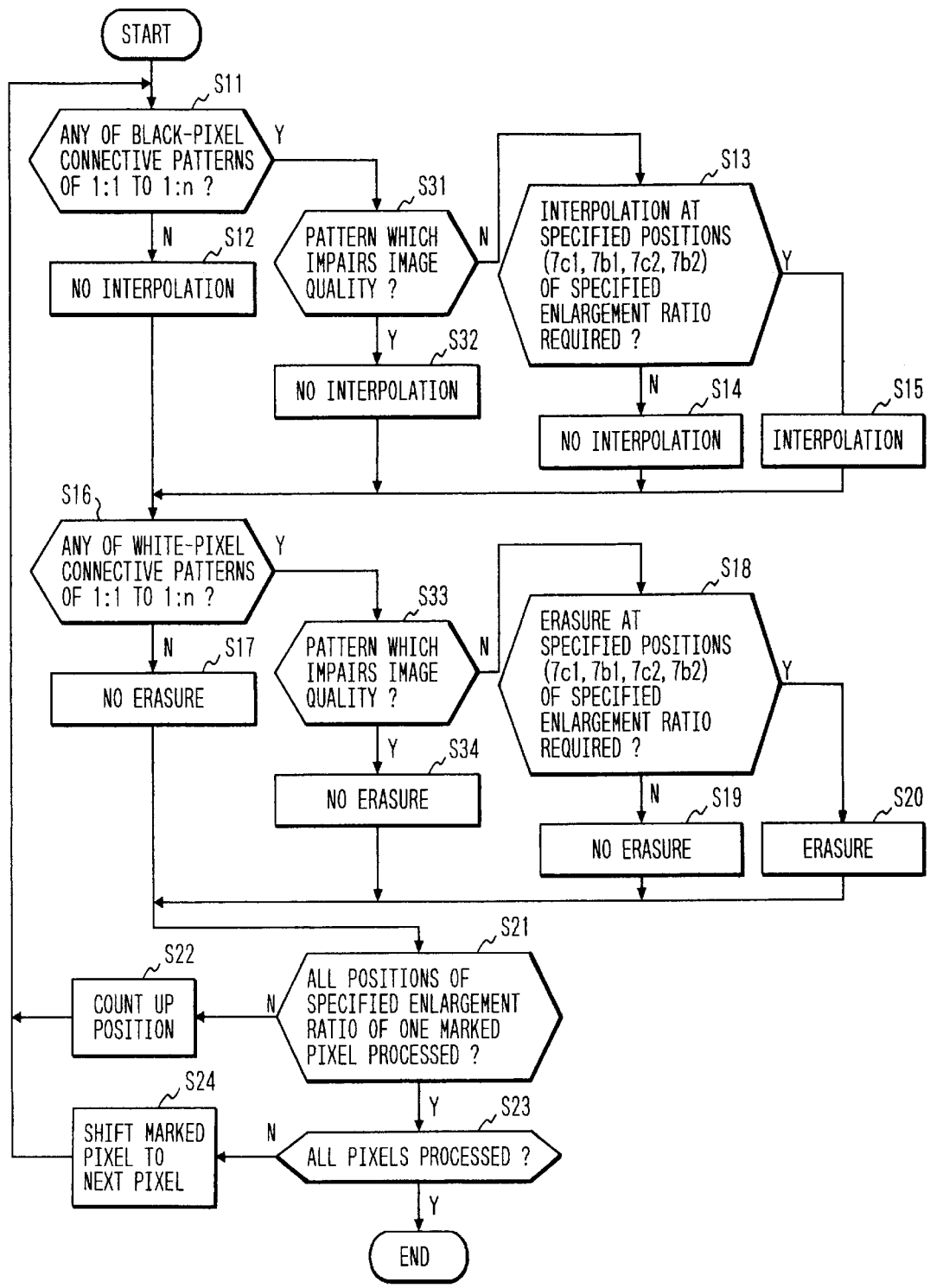
FIG. 13 is a flowchart showing the operation of a third embodiment of the present invention.

Next, the third embodiment of the present invention will be described with reference to a flowchart shown in FIG. 13. This embodiment corresponds to the second embodiment modified so as to have steps S31 to S34. Only those steps S31 to S34 will be described since the remaining steps are the same as those of the second embodiment.

In step S31, the control determines whether or not the black-pixel connective patterns of 1:1 to 1:n deteriorate the picture quality. If the answer is YES, the control proceeds to step S16 without the interpolation (step 32). If the answer to step S31 is NO, the control proceeds to step S13.

Figure 14A:
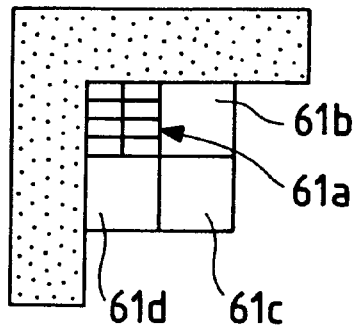
FIGS. 14(a) to 14(c) are explanatory diagrams showing examples of patterns impairing the picture quality.

For example, if the reference pixels of the marked pixel 61a form a black-pixel connective pattern of 3×3, as shown in FIG. 14(a), other pixels than those, i.e., pixels 61b, 61c and 61d, are also referred to. If these pixels 61b, 61c and 61d are all white, the marked pixel 61a is interpolated. That is, the process proceeds from step S31 to step S13.

Figure 14B:
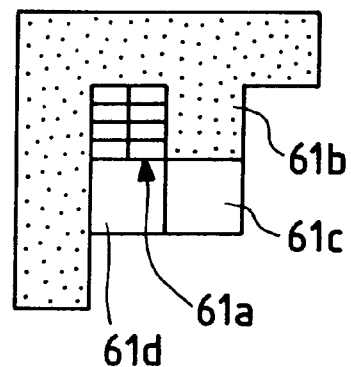

On the other hand, if any of the pixels 61b, 61c and 61d is black as shown in FIG. 14(b), the marked pixel 61a is not interpolated. That is, the process proceeds from step S31 to S32. If the interpolation is made, the white pixel of the marked pixel 61a is painted black, deteriorating the picture quality.

In step S33, the control determines whether or not the white-pixel connective patterns of 1:1 to 1:n deteriorate the picture quality. If the answer is YES, the control proceeds to step S21 without the erasure (step 34). If the answer to step S33 is NO, the control proceeds to step S18.

Figure 14C:
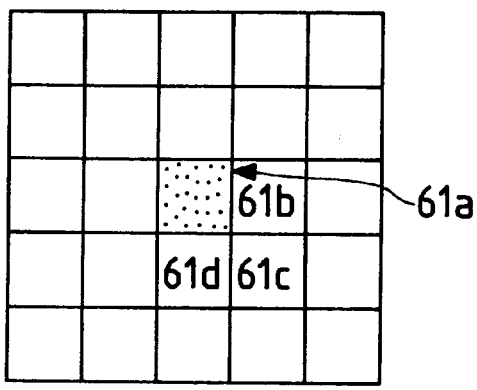

For example, when the reference pixels of the marked pixel 61a form a white-pixel connective pattern of 2×2 as shown in FIG. 14(c), if the adjacent pixels 61b to 61d other than the reference pixels are all white, the control proceeds to step S21 without erasing the black pixel; otherwise, the isolated black pixel would be erased. If any of the pixels 61b to 61d is black, step S18 is executed.

As described above, the third embodiment prevents the white pixels from being painted black and the black pixels from being erased. Therefore, the smoothing process can be carried out without deteriorating the picture quality.

Figure 15:
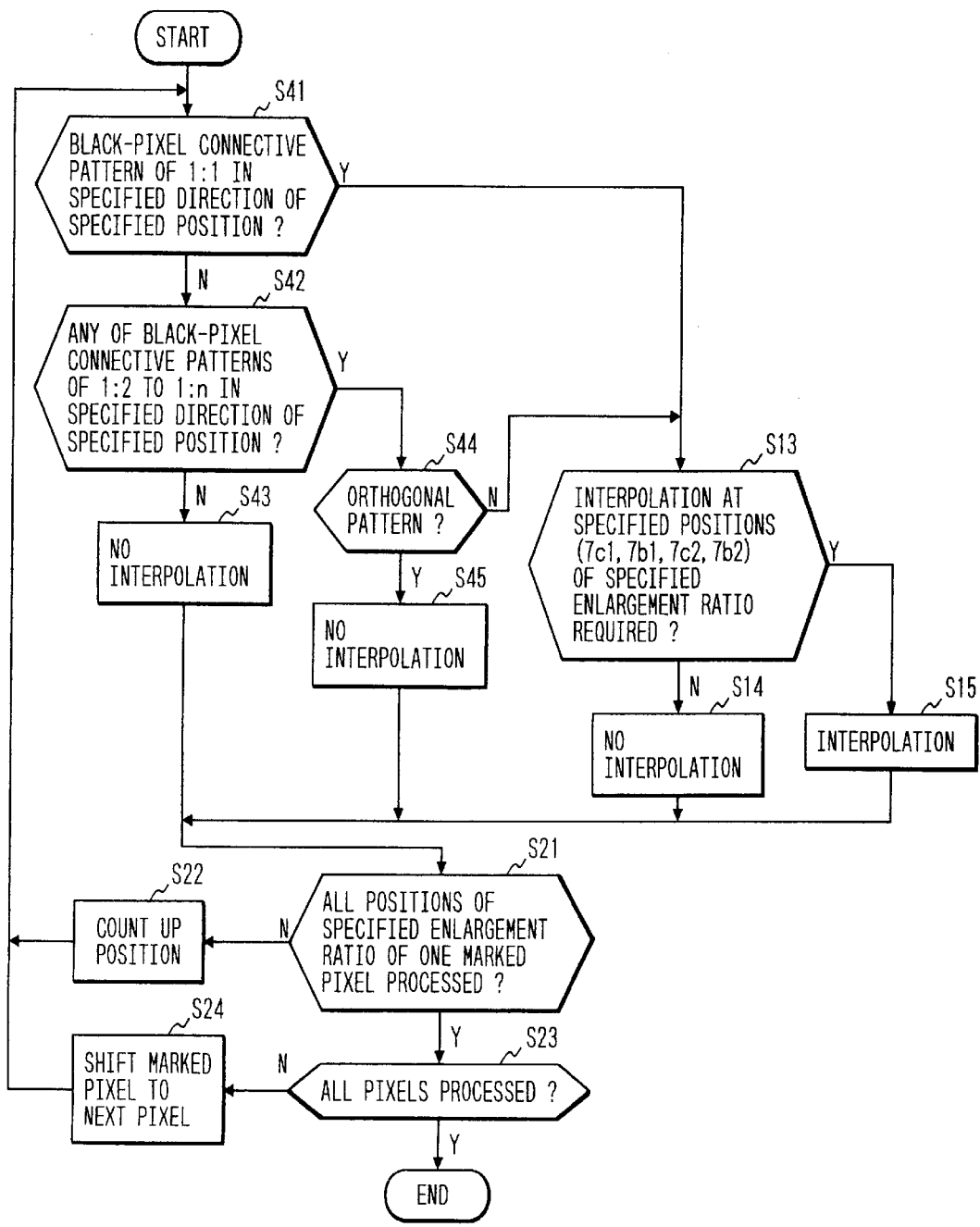
FIG. 15 is a flowchart showing the operation of a fourth embodiment of the present invention.

Next, the operation of the fourth embodiment of the present invention will be described with reference to FIG. 15. In step S41, the control determines whether or not the pixel pattern in the designated direction of the designated position is the pattern of the four directions of black-pixel connective pattern of 1:1. If the answer is YES, the process proceeds to step S13. If the answer is NO, the control proceeds to step S42.

In step S42, the control determines whether or not the pixel pattern in the designated direction of the designated position is any of the patterns of 8 directions of black-pixel connective patterns of 1:2 to 1:n. If the answer is NO, the process proceeds to step S43. If the answer is YES, the control proceeds to step S44. In this step, the control determines whether or not it is an orthogonal pattern. If the answer to this step is YES, the control proceeds to step S45 where no interpolation process is carried out. If the answer is NO, the control proceeds to step S13. In this step, the interpolation process is carried out as previously stated.

Figure 16:
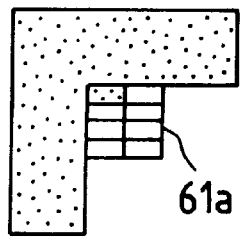
FIG. 16 is an explanatory diagram showing an example of orthogonal pattern.

When the black pixels adjoining to the marked pixel 61a form an orthogonal pattern as shown in FIG. 16, this embodiment applies only the interpolation process of 1:1 in steps S13 to S15 to the marked pixel 61a. In other words, the applied interpolation process is weakened.

Thus, in this embodiment, the interpolation process may be weakened. Accordingly, the right-angled portion of a character, for example, can be smoothed in harmony with other characters and figures. In addition, the fact that if the right-angled portion is kept as it is, it is expressed more sharply, loosing its natural feeling of shape, was discovered by the inventors.

While the enlargement of 2×4 in the fast and slow scan directions is used in the embodiments as mentioned above, it is evident that the present invention is applicable for the enlargements of 1×1 to 6×6.

As described above, according to the present invention, optional input image data can be interpolated at a specified enlargement ratio without a memory by gates, and the interpolated one can be output at a high speed and a high quality.

What is claimed is:

1. An image data enlarging/smoothing processor for carrying out an interpolation process of pixels simultaneously with a pixel density conversion of binary image data, comprising:

connective pattern detecting means for detecting a form of a connective pattern of reference pixels adjoining to a marked pixel;

enlarging/smoothing processing means operating such that said processing means enlarges the marked pixel on the basis of enlargement ratios in fast and slow scan directions, thereby enlarging and smoothing the marked pixel on the basis of the form of the connective pattern of the reference pixels and processing positions in the fast and slow scan directions;

said connective pattern detecting means detecting forms of four directions of a black-pixel connective pattern of 1:1 and forms of eight directions of black-pixel connective patterns of 1:2 to 1:n (n being a positive integer); and said enlarging/smoothing processing means enlarging the marked pixel in accordance with an enlargement ratio, and interpolating the enlarged pixel in accordance with the detected form of the connective pattern.

2. The image data enlarging/smoothing processor according to claim 1, wherein said connective pattern detecting means determines whether or not the connective pattern of the reference pixels impairs the image quality, and if it is determined that the connective pattern impairs the image quality, said connective pattern detecting means does not carry out the interpolation process.

3. The image data enlarging/smoothing processor according to claim 1, wherein said connective pattern detecting means determines whether or not the connective pattern of the reference pixels is an orthogonal pattern in which some adjoining reference pixels are orthogonal to other adjoining reference pixels, and if it is determined that the connective pattern is the orthogonal pattern, said connective pattern detecting means weakens the interpolation process.

4. An image data enlarging/smoothing processor for carrying out an interpolation process of pixels simultaneously with a pixel density conversion of binary image data, comprising:

connective pattern detecting means for detecting a form of a connective pattern of reference pixels adjoining to a marked pixel;

enlarging/smoothing processing means operating such that said processing means enlarges the marked pixel on the basis of enlargement ratios in fast and slow scan directions, thereby enlarging and smoothing the marked pixel on the basis of the form of the connective pattern of the reference pixels and processing positions in the fast and slow can directions;

said connective pattern detecting means detecting forms of four directions of a white-pixel connective pattern of 1:1 and forms of eight directions of white-pixel connective patterns of 1:2 to 1:n (n being a positive integer); and said enlarging/smoothing processing means erasing the marked pixel in accordance with the detected form of the connective pattern.

5. The image data enlarging/smoothing processor according to claim 4, wherein said connective pattern detecting means determines whether or not the connective pattern of the reference pixels impairs the image quality, and if it is determined that the connective pattern impairs the image quality, said connective pattern detecting means does not carry out the erasure process.

6. The image data enlarging/smoothing processor according to claim 4, wherein said connective pattern detecting means determines whether or not the connective pattern of the reference pixels is an orthogonal pattern in which some adjoining reference pixels are orthogonal to other adjoining reference pixels, and if it is determined that the connective pattern is the orthogonal pattern, said connective pattern detecting means weakens the interpolation process.

7. An image data enlarging/smoothing processor comprising:

enlargement ratio determining means for determining enlargement ratios in fast and slow scan directions, which lead to a resolution of an output image, in accordance with a resolution of input image data;

enlargement processing means for developing a pixel area occupied by a marked pixel after said marked pixel is enlarged in accordance with the enlargement ratios determined by said enlargement ratio determining means, said pixel area consisting of a plurality of pixels;

detecting means for detecting a connective pattern of reference pixels adjoining to the marked pixel in the input image data; and black/white determining means for determining whether or not the respective pixels of said pixel area are black or white in accordance with the connective pattern detected by said detecting means.

8. The image data enlarging/smoothing processor according to claim 7, wherein when the connective pattern detected by said detecting means is an orthogonal pattern consisting of black pixels in which some adjoining reference pixels are orthogonal to other adjoining reference pixels, said black/white determining means reduces the number of interpolated pixels in said pixel area to be smaller than that when said connective pattern is a nonorthogonal pattern consisting of black pixels.

9. The image data enlarging/smoothing processor according to claim 8, wherein, when the connective pattern of the reference pixels in the fast and slow scan directions, which is detected by said detecting means, is an orthogonal pattern consisting of black pixels in which some adjoining reference pixels are orthogonal to other adjoining reference pixels, said black/white determining means renders black only one pixel located at a corner where a train of the reference pixels extending in the fast scan direction intersects another train of the reference pixels extending in the slow scan direction within said pixel area.

10. The image data enlarging/smoothing processor according to claim 7, wherein the number of pixels in said pixel area is determined depending on the resolution of the output image.

* * * * *

UNITED STATES PATENT AND TRADEMARK OFFICE
CERTIFICATE OF CORRECTION

PATENT NO. : 6,091,859
DATED : July 18, 2000
INVENTOR(S) : Kenichi SONOBE et al.

It is certified that error appears in the above-identified patent and that said Letters Patent is hereby corrected as shown below:

Claim 4, col. 11, line 29, "can directions" should read --scan directions--.

Signed and Sealed this

Seventeenth Day of April, 2001

*Attest:*

NICHOLAS P. GODICI

*Attesting Officer*  *Acting Director of the United States Patent and Trademark Office*